A. RINDSBERGER.
FASTENING MEANS.
APPLICATION FILED OCT. 31, 1917.
1,358,988.
Patented Nov. 16, 1920.
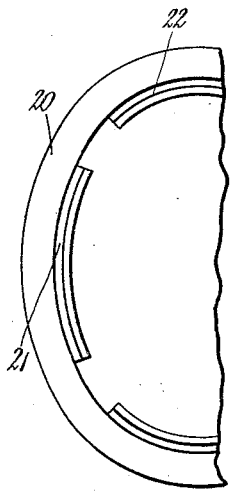
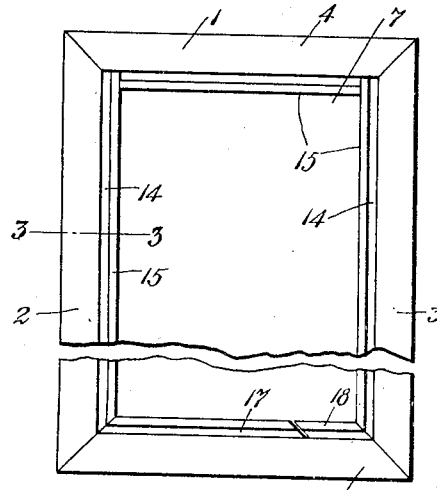
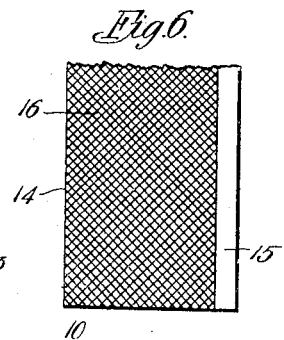
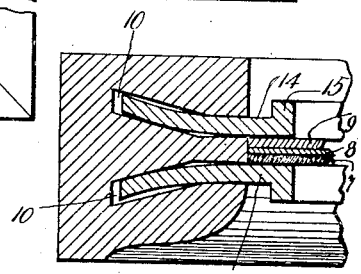
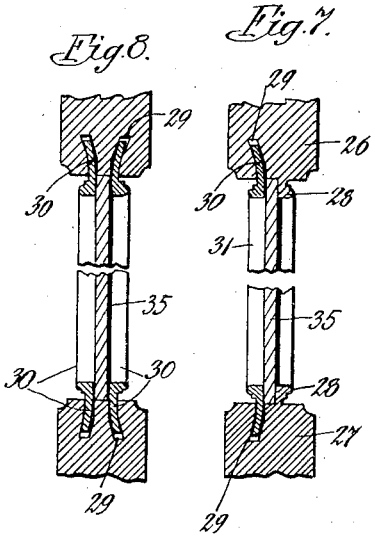
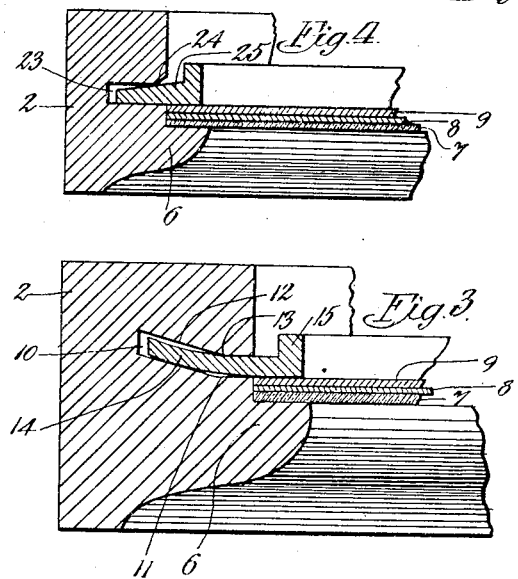
INVENTOR
Albert Rindsberger
by Henry Hech
Attorney.

UNITED STATES PATENT OFFICE.

ALBERT RINDSBERGER, OF CHICAGO, ILLINOIS.

FASTENING MEANS.

1,358,988. Specification of Letters Patent. Patented Nov. 16, 1920.

Application filed October 31, 1917. Serial No. 199,501.

*To all whom it may concern:*

Be it known that I, ALBERT RINDSBERGER, a citizen of the United States, residing at Chicago, in the county of Cook and State of Illinois, have invented new and useful Improvements in Fastening Means, of which the following is a specification.

The invention relates to fastening means capable of varied application and enabling the releasable securing of one member to another.

The principle of the invention consists in providing a fastening element which by virtue of its engagement with one member exerts a pressure upon another member and which pressure is utilized to maintain the member affected thereby in position.

It is an object of the invention to provide a fastening means of comparatively unpliable material capable of a function embodying the principle of the invention.

It is also an object of the invention to provide a fastening element which in functional position is automatically held against displacement, thus dispensing with the necessity of providing special securing means for the fastening element.

A further object aims at the provision of a member having an abutment and a groove, and supporting a second member on said abutment so that a fastening element introduced into said groove will hold said second member in engagement with the abutment.

Another object includes the application of the invention to the detachable fastening of panels in doors, walls and the like.

Another object aims at the provision of means for automatically securing the fastening element in functional position.

Another object embraces the provision of a groove in one member of such form and construction that the fastening element exerts a pressure upon another member upon being introduced into the groove.

It is also an object of the invention to provide certain details and features of construction to enhance the commercial value and desirability of articles equipped with my invention.

To the accomplishment of the general objects stated and others that will become apparent upon perusal of the specification and the claims forming a part thereof, the invention is illustrated in several embodiments in the drawing in which—

Figure 1 is a bottom plan view of a picture frame to which the invention has been applied.

Fig. 2 is a fragmentary similar view of an oval frame.

Fig. 3 is a section on line 3—3 of Fig. 1.

Fig. 4 is a section similar to Fig. 3 but slightly modified.

Fig. 5 is a section through a further modification.

Fig. 6 is a fragmentary top plan view of the fastening means employed in applying the invention.

Figs. 7 and 8 are sectional views illustrating a different mode of application of the invention.

Referring to the drawing and more particularly to Fig. 1, the invention is shown applied to a tray or picture frame generally designated by 1 and comprising the longitudinal members 2, 3 and the transverse members 4, 5. As shown the frame members are dressed to an angle of 45° to form miter joints. Each member is formed with an abutment or shoulder 6 to provide a support for a glass plate 7, a picture or other article 8 and a backing 9 all arranged in superposed relation as is clearly indicated in Fig. 3. At a distance from the shoulder 6 a groove 10 is arranged extending the entire length of the member and comprising an inner portion 11 parallel to the shoulder 6 and an outer portion 12 slantingly provided with respect to said shoulder. At the meeting point of the parallel and slanting portions the wall of the groove 10 remote from the abutment 6 forms a ridge 13 which serves for a purpose presently to be described.

A beam or plate 14 coextensive with the inner edge of the respective frame member with which it is employed, is of comparatively unpliable material, such as wood, and possesses a rectangular cross section. At one side the plate 14 is formed with an upstanding portion 15 to facilitate manipulation of the plate.

To secure the glass plate 7 and parts 8, 9 on the abutment 6 the member 14 is forced into the groove 10, to which end the handle portion 15 is held. In introducing the member 14 it is first guided by the straight groove portion 11 and strikes then the lower wall, as viewed in Fig. 3, of the slanting groove portion 12 which forces the free edge of the member 14 upwardly and thereby produces a slight curvature of said member.

This action of the groove causes engagement between said member and the ridge 13 and simultaneously the part of member 14 without the groove 10 is held in engagement with the backing 9 and consequently the underlying parts 7, 8.

It is evident that the pressure exerted on the parts 7, 8, 9 is caused by virtue of the entrance of member 14 in the groove 10 and varies according to the extent to which the member 14 projects thereinto.

Attention is called to the fact that in the arrangement shown in Fig. 3 the lower wall of the groove is flush with the top of backing 9. While this is a desirable feature it is, nevertheless, not indispensable as provision may be made to transmit pressure from the member 14 to the backing even when the latter is arranged below the bottom wall of the groove. Similarly the horizontal portion of the groove may be omitted and a groove formed with a slant beginning at the inside of the frame member.

The degree of inclination of the groove with respect to the shoulder 6 may be varied within wide limits and will be governed by the kind of material employed, the dimensions of the frame member and the member 14 and other considerations well known to those versed in the art. In order to secure a gripping engagement between the ridge 13 and the member 14, the latter is provided with a roughened surface, as at 16, so that when the member 14 is partly forced into the groove it is automatically locked in position.

The member 14 may be made of any material possessing a slight degree of elasticity, and preferably wood or metal is employed. To provide for convenient removal of the element 14, I make the same coextensive with the inner edge of the longitudinal frame member and the remaining element of a length to form a square joint. The lower portion of Fig. 1 illustrates the provision of fastening element 14 beveled at the ends to form miter joints in registry with the joints of the frame members. In this case one fastening element is subdivided to comprise two separate parts 17 and 18, the line of division being parallel with the adjacent miter joint line.

Fig. 2 illustrates the application of the invention to an oval frame generally designated by 20. Here the fastening elements 21, 22 are formed arcuate in accordance with the curvature of the frame but otherwise are identical in construction and function as the element 14. The fastening members 21, 22 are spaced from one another as is clearly illustrated.

In Fig. 4 the frame member 2 is equipped with a groove 23 at a distance from the shoulder 6 and with the lower wall flush with the top of backing 9. I provide the groove substantially parallel with the abutment 6 and backing 9 and bevel the upper wall at the inner end to provide a ridge 24. The fastening member 25 is of wedge-like construction and also has a roughened surface to be locked in functional position by the ridge 24. The pressure exerted by the member 25 upon the backing is caused by engagement of the top surface of the member 25 with the ridge 24 and may be regulated within narrow limits by more or less insertion of the member in the groove.

In Fig. 5 a modification of the arrangement shown in Fig. 3 is illustrated and is predicated on the employment of two fastening members 14, one above and the other below the parts 7, 8, 9 and serving as an abutment. Both members being of the construction previously recited, further discussion of this modification is deemed superfluous.

Fig. 7 illustrates the application of my invention to doors to secure panels in position. The upper and lower horizontal members 26, 27 similarly to the upright members are formed integral with moldings 28. If preferred, however, the moldings may be made separate and properly secured to the frame members. In front of the moldings 28 the panel 35 is arranged and grooves 29 identical with groove 10 are provided to receive fastening members 30 which also are constructed similar to the members 14 with the exception that the gripping portion 31 is formed to resemble a molding and thereby contributes to enhance the ornamental features of the door.

In Fig. 8 the molding 28 is dispensed with and instead another groove 29 and a fastening member 30 are provided, the latter having the function of the molding 28.

The drawing indicates the invention merely by way of example and various modifications and changes will readily suggest themselves to those versed in the art. The invention may be applied to many purposes without departing from the spirit of this invention. I, therefore, do not limit myself to the modes of application shown nor to the exact structural details as illustrated, but claim my invention as broadly as the state of the art permits.

I claim:

1. In combination with a member provided with a shoulder and a groove spaced therefrom, a second member supported on said shoulder, and an element extending into said groove, said groove being formed with an inner portion parallel to said shoulder and an outer portion slantingly arranged to said inner portion.

2. In combination with a member having a shoulder and a groove spaced therefrom, said groove having an inner wall slanting outwardly and a ridge on the outer wall within said groove, a second member supported on said shoulder, and an element engageable with said groove and being of a configuration to be rocked about the ridge until it engages the member on the shoulder when forced against the slanting wall of the groove and the outer face of said element engages said ridge, said ridge, being adapted to maintain said element in engagement with said second member.

3. In combination with a member provided with a shoulder and a groove spaced therefrom, a second member supported on said shoulder to lie flush with the adjacent wall of said groove, and an element extending into said groove, said groove being formed with an inner portion parallel to said shoulder, and an outer portion slantingly arranged to said inner portion.

4. A joint including a member having a shoulder, a groove spaced from said shoulder, the outer wall of said groove presenting a salient within the groove, and a member engageable with said groove, so as to be permanently pinched by said salient upon insertion to retain said member within the groove, and thrust it toward the shoulder.

5. In combination with a member provided with a shoulder and a groove spaced therefrom, said groove extending parallel to said shoulder for a portion of its depth and then slantingly thereto whereby a ridge is formed on the outer groove wall within the groove, a second member supported on said shoulder and an element engageable with said groove so as to be pinched by said ridge upon insertion to retain said element in the groove and thrust it toward said second member.

6. In combination with a member provided with a shoulder and a groove spaced therefrom, said groove extending parallel to said shoulder for a portion of its depth and then slantingly thereto whereby a ridge is formed on the outer groove wall within the groove, a second member supported on said shoulder and an element engageable with said groove so as to be pinched by said ridge upon insertion to retain said element in the groove and thrust it toward said second member, said element having its outer face roughened.

7. A joint including a member having a shoulder, a groove spaced from said shoulder, the outer wall of said groove presenting a salient within the groove, and a member adapted to be inserted in said groove, said member during insertion being rocked about said salient, said salient being adapted to hold said member toward said shoulder when in functional position.

8. A joint including a member having a shoulder, a groove of uniform width spaced from said shoulder, the outer wall of said groove presenting a salient within the groove, and a member engageable with said groove so as to be pinched by said salient upon insertion to be retained within the groove and thrust toward the shoulder.

In witness whereof I affix my signature.

ALBERT RINDSBERGER.